Figure 1:
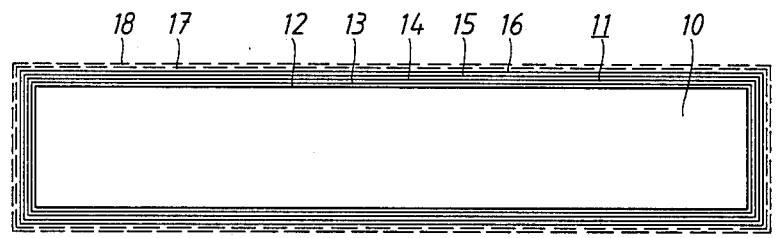

United States Patent [19]

Adlerborn et al.

[11] Patent Number: 4,717,535

[45] Date of Patent: Jan. 5, 1988

[54] METHOD OF MANUFACTURING AN OBJECT OF POWDERED MATERIAL BY ISOSTATIC PRESSING

[75] Inventors: Jan Adlerborn; Leif Hermansson; Hans Larker; Bertil Mattsson; Jan Nilsson, all of Robertsfors, Sweden

[73] Assignee: ASEA Cerama AB, Robertsfors, Sweden

[21] Appl. No.: 48,735

[22] Filed: May 11, 1987

[30] Foreign Application Priority Data

May 13, 1986 [SE] Sweden ................. 8602162

[51] Int. Cl.$^4$ ............................. B22F 1/00
[52] U.S. Cl. .......................... 419/38; 419/39; 419/49; 264/65; 264/570
[58] Field of Search ............ 419/38, 39, 49; 264/65, 264/570

[56] References Cited

U.S. PATENT DOCUMENTS

| | | | |
|---|---|---|---|
| 3,992,200 | 11/1976 | Chandhok | 419/49 X |
| 4,081,272 | 3/1978 | Adlerborn | 419/49 |
| 4,112,143 | 9/1978 | Adlerborn et al. | 419/49 |
| 4,212,669 | 7/1980 | Veeck et al. | 419/49 |
| 4,545,955 | 10/1985 | Dickson | 419/49 |
| 4,568,516 | 2/1986 | Adlerborn et al. | 419/26 |

Primary Examiner—Stephen J. Lechert, Jr.
Attorney, Agent, or Firm—Watson, Cole, Grindle & Watson

[57] ABSTRACT

When manufacturing an object of powdered material by isostatic pressing of a body (10), preformed from the powdered material, with a gaseous pressure medium, the preformed body is provided with a casing (19) of glass which is made gas-impermeable by heating before carrying out the isostatic pressing. Inside the glass casing there is arranged on the preformed body a barrier layer (11) which counteracts the penetration of melted glass from the enclosure in the preformed body. The barrier layer is built up of at least two layers, of which one layer (12) at least substantially consists of powdered boron nitride and one layer (13) of a mixture of powdered boron nitride and a powdered material with the ability, upon contact with glass from the casing in melted form, to make a layer containing boron nitride tighter.

7 Claims, 2 Drawing Figures

METHOD OF MANUFACTURING AN OBJECT OF POWDERED MATERIAL BY ISOSTATIC PRESSING

The present invention relates to a method of manufacturing an object of a powdered material by isostatic pressing of a body preformed from the powdered material.

When the preformed body is subjected to the isostatic pressing at the sintering temperature, in order to provide a desired dense, sintered product it is enclosed within a casing which is able to prevent the pressure medium then used, normally a gas, from penetrating into the powder body. Glass in the form of particles which can be applied on or around the preformed body in different ways is often used as a casing. The preformed body with the applied casing is then heated, usually under vacuum, at such a temperature that the glass particles form a dense casing around the preformed body. When the preformed body, later on during the isostatic pressing, is subjected to a pressure at elevated temperature, problems normally arise caused by the glass in the casing penetrating into pores in the preformed body and/or reacting with superficially located portions on the preformed body. To prevent such an event, the powder body can be surrounded by a barrier layer. It is known that such a barrier layer may consist of powdered boron nitride. Boron nitride is suitable as material in a barrier layer because it has little tendency to react with the solid ceramic and metallic materials which are used in the manufacture of objects by isostatic pressing and because it is easily removable since a layer of boron nitride is relatively soft and has relatively low strength. However, the function of the boron nitride as barrier layer has proved to be unsatisfactory in thoses cases where considerable demands are placed on the quality of the pressed and sintered end product. The reason is that a layer of boron nitride has a certain porosity and therefore cannot sufficiently effectively prevent the occurrence of a certain passage of a low-viscous glass and so prevent this glass from penetrating into pores in the preformed body and/or reacting at its surface, so that the quality of the powder body is deteriorated by the occurrence of glass therein or of reaction products of glass and the material in the preformed body.

According to the present invention, it has proved to be possible to achieve a barrier layer which completely resists a penetration of melted glass, or in any case minimizes it so that damage caused by penetration is eliminated or reduced to a minimum, and which has little tendency to react with the material in the preformed body, and further which has a low strength so that the barrier layer can be easily removed from the pressed and sintered end product. According to the invention, this is effected by the combination of one or more layers of powdered boron nitride with one or more layers of a mixture of powdered boron nitride and a powdered material with the ability, upon contact with the melted glass in the casing, to make a layer containing boron nitride tighter against the glass.

More particularly, the present invention relates to a method of manufacturing an object of a powdered material by isostatic pressing of a body preformed from the powdered material with a gaseous medium, comprising providing the preformed body with a casing of glass or of a material forming glass upon heating, and arranging a barrier layer containing powdered boron nitride, which counteracts the penetration of glass in melted form from the casing into the preformed body, on the preformed body inside the casing and making the casing of glass impermeable to gas by heating, before carrying out the isostatic pressing while sintering the preformed body, characterized in that the barrier layer is built up of at least two layers containing powdered boron nitride, of which one layer at least substantially consists of boron nitride and one layer of a mixture of powdered boron nitride and a powdered additive material with the ability, upon contact with glass in melted form from the casing, to make a layer containing boron nitride tighter against melted glass in the enclosure.

The boron nitride may consist of boron nitride of commercially available qualities. Such qualities contain a certain amount of oxygen in the form of boron oxide. The content of foreign substances in boron nitride in layers, at least substantially consisting of boron nitride, preferably amounts to at most 10 percent by volume.

The additive material may advantageously consist of a material with the ability, upon contact with the glass in the enclosure in melted form, to increase the viscosity of the glass in the contact region and hence reduce its ability to penetrate through the layer of boron nitride and additive material. Examples of such additive materials, which are assumed to act in this manner, are silicon carbide, silicon nitride and a glass with a higher melting point than the glass in the casing. Particles of silicon carbide and silicon nitride of a normal commercial quality have surface regions containing a certain amount of oxygen in the form of silicon dioxide. This property is assumed to result in such particles being wetted by the melted glass and reacting with this glass at the surface without the particles being dissolved, which leads to an increase in the viscosity of the glass. Other substances than silicon carbide and silicon nitride with oxide-containing surfaces, which are able to react with glass in a corresponding way, may also be used as additive materials. Among types of glass which may be used as additive material may be mentioned a glass containing 96.7 percent by weight $SiO_2$, 2.9 percent by weight $B_2O_3$ and 0.4 percent by weight $Al_2O_3$ (Vycor ®), and quartz glass if a glass with a lower melting point is used as material in the casing, such as of the low-melting types exemplified below for the casing. When melted glass of a low-melting type from the casing comes into contact with the high-melting glass in the barrier layer, the viscosity of the glass of low-melting type is markedly increased, so that a penetration of the layer does not occur or is greatly counteracted. The volume of additive material in the mixture suitably constitutes 20–80 and preferably 30–70% of the total volume of the boron nitride and the additive material in the mixture thereof.

The particle size of the boron nitride and of the additive material suitably amounts to 0.1–45 $\mu$m and preferably to 0.1–5 $\mu$m. The particularly preferred particle size is 0.3–2 $\mu$m.

The thickness of a layer which at least substantially consists of boron nitride, as well as the thickness of a layer consisting of a mixture of boron nitride and an additive material, suitably amounts to 0.05–0.5 mm and preferably to 0.1–0.3 mm.

As will be clear from the above, boron nitride is inert to a large number of powdered materials which may be used in the manufacture of objects by isostatic pressing. Normally, therefore, the layer of boron nitride only is arranged nearest the preformed body and the layer of the mixture of boron nitride and the additive material, which may be somewhat less inert, is arranged outside the first-mentioned layer. Normally, it is suitable to use, also outside the last-mentioned layer, a layer of boron nitride only.

In certain cases, when great demands are placed on the properties of the finished end product, it may be necessary to use several layers, for example three or four layers, of only boron nitride and several layers of a mixture of boron nitride and an additional material with the last-mentioned layers arranged alternately with the first-mentioned ones.

Each layer of boron nitride and of a mixture of boron nitride and additive material, respectively, can be effected by dipping the preformed body into or spraying it with a slurry of boron nitride or a mixture of boron nitride and additive material in a solvent, for example acetone, ethanol or another alcohol, possibly containing a binder such as butyl acrylate, followed by a drying of the preformed body.

The powdered material from which the object is manufactured preferably constitutes a ceramic material or a metallic material. As examples of ceramic materials, to which the present invention is applicable, may be mentioned nitrides such as silicon nitride, especially if it contains oxides which may react with glass, silicon aluminium oxide nitride, aluminium nitride, titanium nitride, zirconium nitride, metal oxides such as aluminium oxide, zirconium oxide, both fully and partially stabilized, magnesium oxide, carbides such as silicon carbide, boron carbide and titanium carbide, borides such as titanium boride, zirconium boride and mixtures of such materials.

As examples of metallic materials may be mentioned, among other things, steel, iron-based alloy, for example 3% Cr-Mo-steel containing 0.33% C, 0.30% Si, 0.40% Mn, 0.01% P, 0.01% S, 2.8% Cr, 0.6% Mo, the balance being Fe, or 12% Cr-Mo-V-Nb-steel containing 0.18% C, 0.25% Si, 0.60% Mn, 0.01% P, 0.01% S, 11.5% Cr, 0.5% Ni, 0.5% Mo, 0.30% V, 0.25% Nb, the balance being Fe, or an alloy containing 1.27% C, 0.3% Si, 0.3% Mn, 6.4% W, 5.0% Mo, 3.1% V, 4.2% Cr, the balance being Fe, or of a nickel-based alloy, for example an alloy containing 0.03% C, 15% Cr, 17% Co, 5% Mo, 3.5% Ti, 4.4% Al, 0.03% B, the balance being Ni, or an alloy containing 0.06% C, 12% Cr, 17% Co, 3% Mo, 0.06% Zr, 4.7% Ti, 5.3% Al, 0.014% B, 1.0% V, the balance being Ni. The percentage here relates to percentage by weight.

As examples of applicable materials in glass in the casing around the preformed body may be mentioned a low-melting glass such as a glass containing 80.3 percent by weight $SiO_2$, 12.2 percent by weight $B_2O_3$, 2.8 percent by weight $Al_2O_3$, 4.0 percent by weight $Na_2O$, 0.4 percent by weight $K_2O$ and 0.3 percent by weight CaO (Pyrex®), further an aluminium silicate containing 58 percent by weight $SiO_2$, 9 percent by weight $B_2O_3$, 20 percent by weight $Al_2O_3$, 5 percent by weight CaO and 8 percent by weight MgO, and mixtures of particles of substances, for example $SiO_2$, $B_2O_3$, $Al_2O_3$ and alkali and earth alkali metal oxides forming glass upon heating. For materials with high sintering temperatures it is also possible to use a high-melting glass, such as a glass containing 96.7 percent by weight $SiO_2$, 2.9 percent by weight $B_2O_3$ and 0.4 percent by weight $Al_2O_3$ (Vycor®), further quartz glass and mixtures of particles, for example $SiO_2$ and $B_2O_3$ forming glass upon heating.

The pressure and the temperature for the isostatic pressing and the sintering of a ceramic or metallic material are, of course, dependent on the type of this material. Normally, however, the pressure should amount to at least 100 MPa and the temperature to at least 1000° C.

Figure 2:
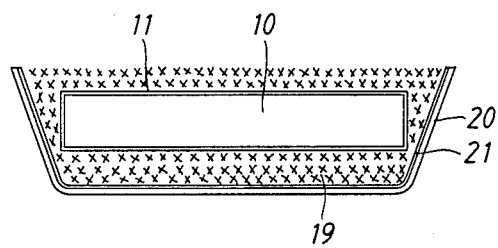

The invention will be explained in greater detail by way of examples with reference to the accompanying drawing, wherein FIG. 1 shows a schematic view of a preformed body provided with a barrier layer according to the present invention, and FIG. 2 shows the same body on a reduced scale arranged in an casing of glass.

EXAMPLE 1

Aluminium oxide with a particle size of 0.1–2 μm is placed in a capsule of plastic, for example softened polyvinyl chloride or rubber of approximately the same shape as the preformed body to be produced. The capsule is sealed and the capsule with its contents is subjected to a compaction at 600 MPa for a period of 5 minutes at room temperature. After completed compaction the capsule is removed and the body thus manufactured is machined into the desired shape.

The preformed powder body 10 obtained after the machining, shown in FIG. 1, has a cylindrical shape. On it there is applied a barrier layer 11 in order to prevent the penetration of glass from the glass enclosure by which the powder body is surrounded during the isostatic pressing. The barrier layer 11 is composed of five layers 12, 13, 14, 15 and 16 arranged one on top of the other. These layers are drawn with greatly exaggerated thickness in FIG. 1. For application of layer 12 there is used a slurry containing 40 percent by weight boron nitride with a particle size of 0.3–2 μm, 3 percent by weight polymethyl methacrylate and 57 percent by weight acetone. The slurry is sprayed onto the body so that all surfaces are covered with a layer of the slurry. When the acetone has evaporated, the layer has a thickness of 0.2 mm. Thereafter there is applied, also by spraying, a layer 13 of a slurry containing 17 percent by weight boron nitride, 26 percent by weight silicon carbide, 3 percent by weight butyl acrylate and 54 percent by weight isopropanole. After drying, the layer 13 has a thickness of 0.2 mm. Of the total amount of boron nitride and silicon carbide in layer 13, the boron nitride constitutes 50 percent by volume and the silicon carbide 50 percent by volume. On layer 13 there is applied, in similar manner as layer 12, a layer 14 of the same kind as layer 12, on layer 14 there is applied, in similar manner as layer 13, a layer 15 of the same kind as layer 13, and on layer 15 there is applied, in similar manner as layer 12, a layer 16 of the same kind as layer 12. The total thickness of layers 12–16 amounts to 1 mm.

In accordance with FIG. 2, the preformed body 10 with the applied barrier layer 11 is provided with a casing 19 of glass in the form of a mass of glass particles arranged in a graphite crucible 20 which is provided on the inside with a release layer 21. The preformed body is thus embedded in the mass of glass particles 19. The glass in this mass consists of 80.8 percent by weight $SiO_2$, 12.2 percent by weight $B_2O_3$, 8.2 percent by weight $Al_2O_3$, 4.0 percent by weight $Na_2O$, 0.4 percent by weight $K_2O$ and 0.3 percent by weight CaO. The crucible 20 with its contents is placed in a furnace, in which the binder in the barrier layer 11, i.e. the acrylate, is driven off in vacuum while successively increasing the temperature to 400° C. and maintaining this temperature for a few hours. Thereafter, the crucible 20 with contents is placed in a high-pressure furnace in which the necessary pressure can be generated by supplying a gas, for example argon, and the necessary temperature can be generated by conventional heating devices.

First, the crucible 20 is heated to a temperature of 1000°–1200° C. at atmospheric pressure so that the glass casing forms a melt and becomes gas-impermeable. Thereafter, the pressure is raised to 150 MPa and the temperature is raised to 1300°–1400° C. and these conditions are maintained for a period of 3 hours. This causes the aluminium oxide to sinter while forming a body with a density of 99.9% of the theoretical. When the body has been allowed to cool and the capsule has been removed, the barrier layer 11 can be removed without difficulty by steel brushing or blasting.

EXAMPLE 2

The same procedure as described under Example 1 is used in modified form for the manufacture of an object of a 12% Cr-Mo-V-Nb-steel containing 0,18% C, 0.25% Si, 0.60% Mn, 0.01% P, 0.01% S, 11.5% Cr, 0.5% Ni, 0.5% Mo, 0.30% V, 0.25% Nb, the balance being Fe, and with a grain size smaller than 800 μ. However, instead of silicon carbide there is used the same volume of silicon nitride in layers 13 and 15. In addition, a layer 17 is applied on layer 16 of the same kind as layers 13 and 15, i.e. a layer containing equal volumes of boron nitride and silicon carbide, and a layer 18 containing boron nitride only is applied on layer 17. In this case, the isostatic pressing is carried out at a temperature of 1200° C.

EXAMPLE 3

An object of aluminium oxide is manufactured in the same way as described under Example 1 with the difference that, instead of silicon carbide, there is used a high-melting glass in layers 13 and 15. Thus, these layers consist of a mixture of equal volumes of boron nitride and a high-melting glass. The glass may consist of 96.7 percent by weight $SiO_2$, 2.9 percent by weight $B_2O_3$ and 0.4 percent by weight $Al_2O_3$.

We claim:

1. A method of manufacturing an object of a powdered material by isostatic pressing of a body (10), preformed from the powdered material, with a gaseous pressure medium, comprising providing the preformed body with a casing (19) of glass or of a material forming glass upon heating, arranging a barrier layer (11) containing powdered boron nitride, which counteracts the penetration of glass in melted form from the casing into the preformed body, on the preformed body inside the casing, and making the glass casing impermeable to gas by heating before carrying out the isostatic pressing while sintering the preformed body, characterized in that the barrier layer is built up of at least two layers (12, 13) containing powdered boron nitride, of which one layer (12) at least substantially consists of boron nitride and one layer (13) of a mixture of powered boron nitride and a powdered additive material with the ability, upon contact with the glass in melted form from the casing, to make a layer containing boron nitride tighter against melted glass in the casing.

2. A method according to claim 1, characterized in that the additive material consists of a material with the ability, upon contact with melted glass in the casing, to increase the viscosity of the glass on the contact region.

3. A method according to claim 1, characterized in that the additive material consists of silicon carbide, silicon nitride or of a glass with a higher melting temperature than the glass in the casing.

4. A method according to claim 1, characterized in that the layer which at least substantially consists of powdered boron nitride (12) is arranged inside the layer (13) consisting of a mixture of pwodered boron nitride and a powdered additive material.

5. A method according to claim 1, characterized in that the barrier layer (11) comprises at least two layers (12, 14) which at least substantially consist of powdered boron nitride, and a layer (13) arranged therebetween consisting of a mixture of powdered boron nitride and a powdered additive material.

6. A method according to claim 1, characterized in that the barrier layer comprises three layers (12, 14, 16) which at least substantially consist of powdered boron nitride, and two layers (13, 15) which consist of a mixture of powdered boron nitride and a powdered additive material and which are each arranged between two of the layers at least substantially consisting of powdered boron nitride.

7. A method according to claim 1, characterized in that the barrier layer comprises four layers (12, 14, 16, 18) which at least substantially consist of powdered boron nitride, and three layers (13, 15, 17) which consist of a mixture of powdered boron nitride and a powdered additive material and which are each arranged between two of the layers at least substantially consisting of powdered boron nitride.

* * * * *